United States Patent [19]

Sweeney

[11] 4,400,134
[45] Aug. 23, 1983

[54] COLLECTOR APPARATUS

[75] Inventor: William T. Sweeney, Halesowen, England

[73] Assignee: Eurotech International Limited, Cradley Heath, England

[21] Appl. No.: 234,752

[22] Filed: Feb. 17, 1981

[30] Foreign Application Priority Data

Feb. 22, 1980 [GB] United Kingdom ............... 8006149

[51] Int. Cl.³ ..................... F04D 13/08; F04D 25/16
[52] U.S. Cl. .................................... 415/62; 415/65; 415/66; 415/69
[58] Field of Search ..................... 415/62, 64, 66, 69, 415/120, 60, 65, 68, 198.1, 199.1, 199.2

[56] References Cited

U.S. PATENT DOCUMENTS 3,101,170  8/1963  Pavlecka ........................... 415/65 X
3,941,499  3/1976  Kronogard ..................... 415/199.2 X

FOREIGN PATENT DOCUMENTS

1039694  9/1952  Fed. Rep. of Germany ........ 415/64
1034454  4/1953  France ................................. 415/65

Primary Examiner—Chris K. Moore
Attorney, Agent, or Firm—Holman & Stern

[57] ABSTRACT

Pumping apparatus for collecting polluted liquids such as oil on water and including a first pumping stage comprising a rotatable annular rotor having curved blades shaped to draw liquid inwardly towards the center of rotation, and stationary blades disposed within the rotor blades to receive liquid into the spacers between them, and a further pumping stage having rotatable blades shaped to receive the liquid from the stationary blades and deliver it under pressure in an upward direction to an outlet. The pumping apparatus may be mounted on a flotation unit which is suitable for collection of oil from the surface of water.

23 Claims, 7 Drawing Figures

COLLECTOR APPARATUS

BACKGROUND OF THE INVENTION

1. Field of the Invention

This invention is concerned with apparatus for collecting polluted liquids for separation of the pollutants therefrom.

The invention has particular, though not exclusive application to the clearing of oil from water. When oil is spilled on water it floats on the surface to a greater or lesser extent dependent upon the relative specific gravities of the water and of the oil and also upon the extent to which emulsification has taken place. Heavy oils, which are near solid and debris, is relatively easily collected from the water surface but lighter oils are more difficult to deal with. Of course the greater the quantity and spread of the oil, the more difficult it is to dispose of.

2. Description of the Prior Art

There have been major oil spillages at sea, as a result of ship-wreck or oil well damage and the oil slicks escaping have been very large and in some cases covering many square miles of the sea's surface. Similar problems also exist in inland waterways, pools, lakes or even on tank surfaces.

Many solutions to the problem of dispersal or removal of oil slicks at sea have been proposed but no one satisfactory solution has been found, with the result that extensive damage to neighbouring shore lines and to marine lift both above and below the surface of the sea and on the sea bottom has occurred.

The attempts to deal with the problem of oil slicks at sea include spraying the surface with detergents to cause the oil to disperse and sink, this, in some cases causing it to sink to the sea bed, thus effectively destroying marine life over a large area. Wide dispersion often results in less pollution ashore, but there is still some damage over a wider area. It is however generally accepted that it is better to dispose of the oil while it is still at sea then when it has come ashore because the collection and disposal, particularly of heavy crude oils from beaches and the shore is a very difficult task. Collecting of oil or other pollutants from the sea bed has not been successful with any known system.

BRIEF SUMMARY OF THE INVENTION

The object of this invention is to provide apparatus for collecting polluted liquids, such as oil on water, for removal of the pollutants therefrom, in a particularly effective manner.

According to the present invention there is provided pumping apparatus for collecting polluted liquids including a first pumping stage comprising a rotatable annular rotor having blades shaped and arranged to draw the liquids inwardly from the external periphery towards the center of rotation, stationary blades disposed within the rotor, shaped and arranged to guide the liquids inwardly from the rotor and a further pumping stage having rotatable blades shaped and arranged to deliver the liquids from the first pumping stage under pressure to an outlet of the pumping apparatus.

Preferably the first pumping stage rotor has blades of part circular shape in plan, the convex faces of the blades being generally outwardly of the rotor and the blades being generally inclined to the direction of rotation, and the stationary blades are also of curved shape with their convex faces presented oppositely to those of the rotor blades, the stationary blades being generally oppositely inclined to those of the rotor.

Conveniently the further pumping stage blades are curved and of generally part spiral form whereby liquid entering between these blades in a generally horizontal direction, towards the center of rotation of the said blades, is turned through an angle to flow vertically.

In one example the flow from said further pumping stage is generally vertically. In another example the flow is first vertically and then outwardly of the center of rotation, under centrifugal force.

Conveniently the pumping apparatus is mounted on a flotation vessel by means of which the pumping apparatus can travel across a water surface to collect pollutants from on or under said surface.

BRIEF DESCRIPTION OF THE DRAWINGS

The invention will now be described by way of example with reference to the accompanying drawings wherein.

DETAILED DESCRIPTION

Figure 1:
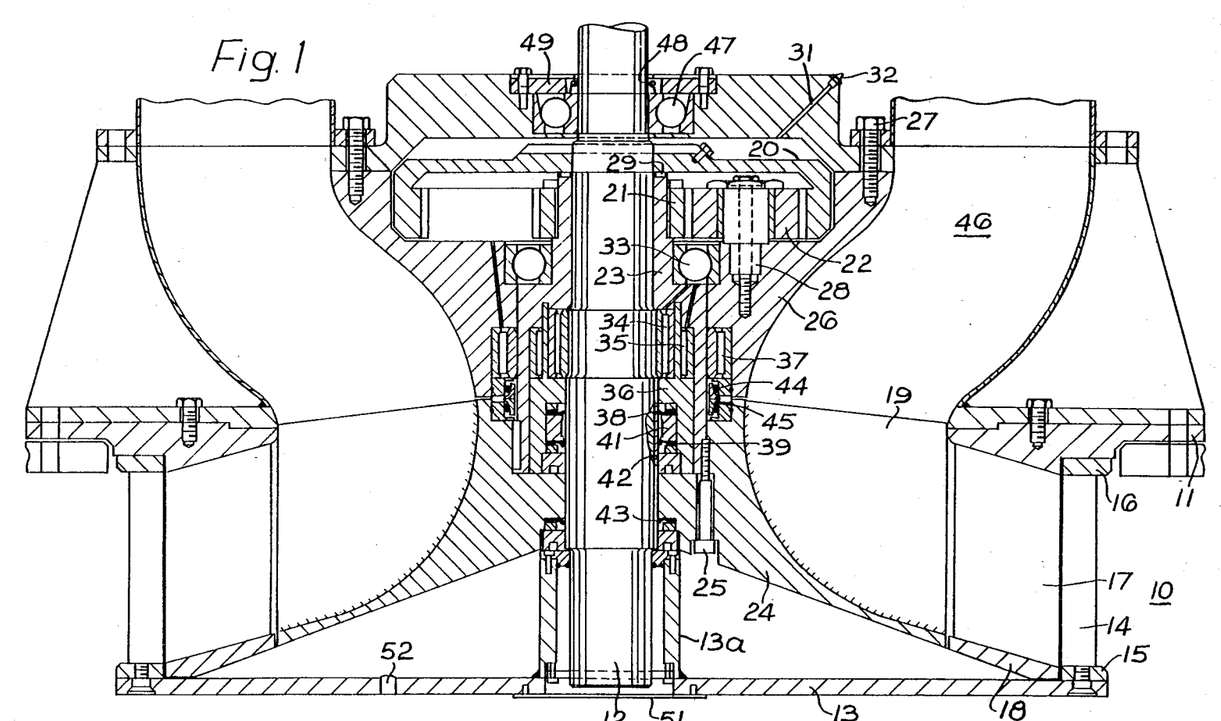
FIG. 1 is a cross-sectional side elevation view of pumping apparatus constructed in accordance with the invention.

FIG. 1 shows a pumping apparatus which is intended primarily for the collection of polluted water such as for example that polluted by oil at sea. Further reference will be made to the way in which this pumping apparatus is used in particular with reference to FIG. 5 which shows a seagoing flotation unit on which the pumping apparatus is mounted. In order to collect polluted water the pumping apparatus is set at or just below the surface so that the annular entry which is identified at 10 will collect the water in the surface region.

The pumping apparatus includes a stationary casing 11 in which is mounted a central rotary shaft 12. The shaft is connected for rotation to an electric motor (not shown) at its upper end. Alternatively the drive may be by an hydraulic motor directly connected. However an electric motor would have a suitable gearbox containing a reduction gear. The motor has to be of the fully immersed type having provision to prevent the ingress of water during use. Carried at the lower end of the shaft 12 is a rotor comprising a disc 13 mounted on a sleeve 13a which surrounds the lower end of the shaft. Secured to the outer edge of the disc are blades 14. These are mounted between rings 15, 16 and are angled so that as the rotor rotates water is drawn in by the blades towards the center of rotation of the shaft.

Figure 2:
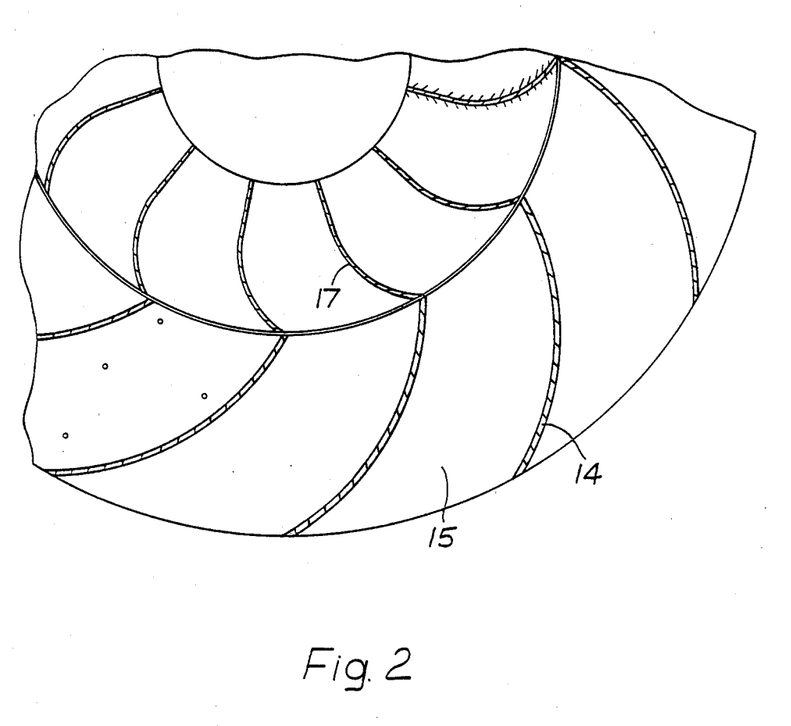
FIG. 2 is a diagrammatic view of the rotating and fixed blades of the pumping apparatus, though of a slightly different version.

The ring 16 is in a recess in the casing 11 so that the entry is defined by the blades 14. Secured to the casing 11 are stationary blades 17 having their outer periphery close to but clear from the internal periphery of the rotary blades 14 on the rotor. The stationary blades 17 are secured at their lower ends to a ring 18 which is fixed to the casing adjacent to the disc 13 with small clearance and serves to guide most of the water through the blades in a somewhat upwardly direction but primarily inwardly towards the center of rotation of the shaft 12. The rotary and stationary blades 14 and 17 represent a first pumping stage of the apparatus. The blades are so shaped that the flow takes place generally inwardly and FIG. 2 shows the blade configuration in plan although FIG. 2 shows a slightly different version in which the blade proportions differ from those shown in FIG. 1. As can be seen from FIG. 2 the blades 14 are of part circular or other curved configuration with the convex faces presented generally outwardly of the rotor. The blades are generally inclined to a radial line so that each has an outer edge on the periphery of the rotor which is between radial and tangential arrangement. Rotation of the rotor causes the blades 14 to tend to scoop the polluted liquid inwards and to deliver it to the spaces between the stationary blades 17. FIG. 2 shows the shapes of the blades 17 which are part radial and part curved. The inner ends are substantially radial whereas the outer ends are curved having their convex faces oppositely presented to those on the rotor but again being generally inclined with respect to the radial. In this example the spacing of the blades is at 30° with respect to the axis of rotation. 12 blades are therefore fitted. However in alternative examples different numbers of blades with different spacing can be employed.

The shaft speed in this example is approximately 150 rpm. If blade tip speed is in excess of a predetermined value, turbulence tends to occur which reduces pumping efficiency. The pumping apparatus is on the contrary intended to draw the liquid inwardly so that radial inward flow results. Thus the effect of centrifugal force creates only mechanical stresses within the material of the rotating elements.

The shaft 12 drives the rotor directly but there is a stepup gear arrangement which drives further blades 19. The stepup gear includes an annular gear ring 20, a crown wheel 21 and at least one planet pinion 22, although preferably three are used. The annular gear ring 20 is non rotatably fixed on the shaft 12. The crown wheel 21 is carried on a rotary stepped sleeve 23 on which in turn the blades 19 are carried. The blades 19 are welded or pinned to a rotor 24 fixed to the lower end of the sleeve 23 through a key way and bolts 25. The planet pinion 22, is or more than one where fitted are, rotatably mounted in a collar 26 secured to the casing 11 by bolts 27. The planet pinion 22 is, or pinions are, mounted on the collar 26 through a journal bearing assembly indicated generally at 28 which allows the planet pinion 22 to rotate as the annular gear ring 20 rotates so that stepup gearing occurs to drive the crown wheel 21 and its sleeve 23 at a speed in this example of between 375 and 550 rpm.

A thrust bearing 29 is positioned between the annular gear ring 20 and the end of the sleeve 23 to accept axial thrust loads. A lubrication passage 31 is provided in the casing 11 having a nipple 32 at its outer end whereby lubricant can be pumped into the space containing the annular gear ring 20 the planet pinion 22 or pinion and the crown wheel 21. The supply of lubricant can thence reach the other bearings and sleeves.

The sleeve 23 is mounted in a bearing 33 of ballrace type situated between the sleeve 23 and the collar 26. On the shaft is mounted a needle roller bearing 34 on which is journalled a seal sleeve 36 and outside this again is a further needle roller bearing 35 carried on the sleeve 23. To support this in turn on the fixed collar 26 is a still further needle roller bearing 37. Drillings and appropriate spaces are provided to enable lubricant to reach the bearings 34, 35 and 37 from the ballbearing 33.

The seal sleeve 36 carries opposed lipseals 38, 39 separated by a spacer 41. These lipseals 38, 39 engage on the shaft 12 which in that region is coated with a ceramic material as indicated by 42. This serves to guard against corrosion and ensures effectiveness of the seal to prevent ingress of water to the moving parts including the bearings and the gears.

Attached to the rotor 24 carrying the blades 19 is a further seal assembly including a lipseal 43 which also bears on the ceramic surface of the shaft 12.

The roller bearing 37 which is outside the sleeve 23 is also protected from ingress of liquid by a double sided seal indicated generally at 44. This includes two compressible rings which are compressed between fixed surfaces and respective movable parts of a split ring 45.

The blades 19 are of part spiral shape there being in this example 6 such blades. These blades have their outer peripheries close to but spaced from the inner edges of the stationary blades 17 and receive the liquid therefrom flowing in an inward direction. The blades 19 cause the flow of liquid to be changed in direction from radially inward to axially upward flow. At the same time they impart pressure to the upward flow, the blades 19 rotating faster than the rotor blades 14 by virtue of the stepup gearing as explained above.

The liquid leaving the upper edges of the blades 19 flows through an outlet duct 46 at the top of the casing. This is connected to an appropriate manifold (not shown) which carries the liquid away to an appropriate point at which it may be filtered or otherwise processed to remove the pollutants.

The shaft 12 has a further ballbearing 47 and an adjacent seal 48 adjacent to the upper end, this being secured by a cover plate 49. The lower end of the shaft is enclosed by a further cover plate 51 and in the disc 13 there is a drain hole 52.

Figure 3:
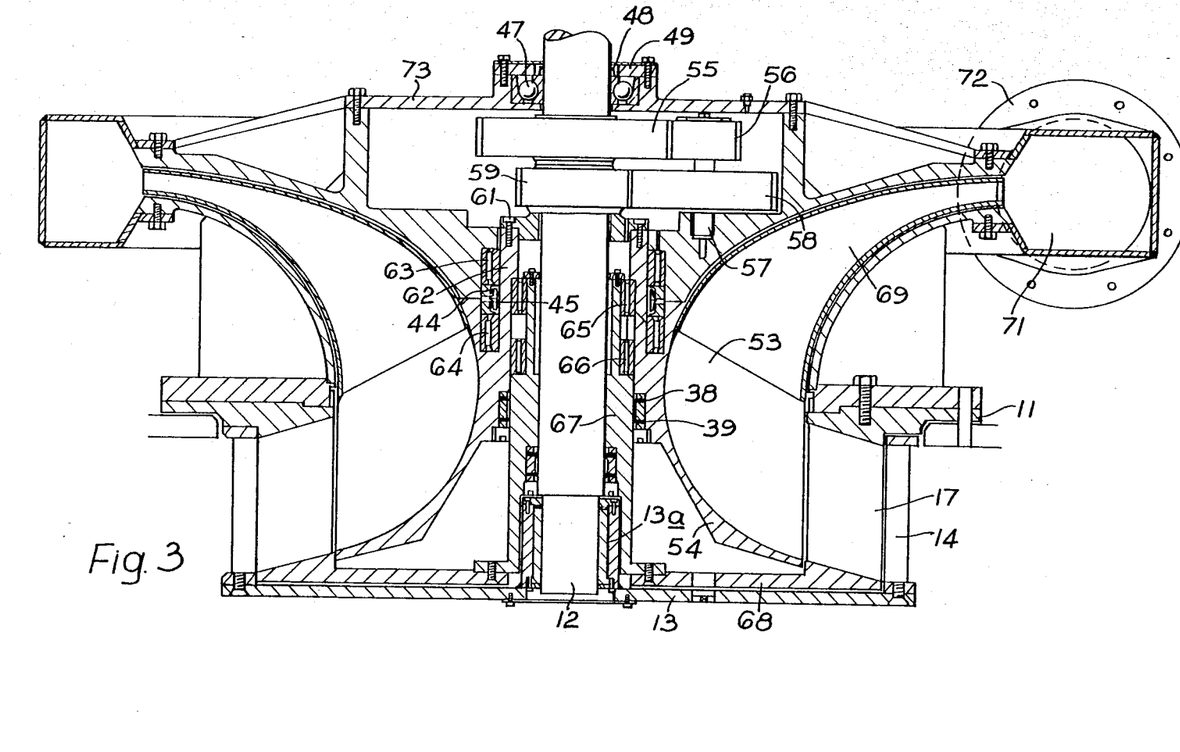
FIG. 3 is a cross-sectional view of an alternative form of the pumping apparatus.

Referring to FIG. 3 this shows a pumping apparatus similar to that of FIG. 1 with the exception of the outlet arrangements. Similar numerals are used for the same components where appropriate. Thus a central shaft 12 carries a rotor including a disc 13 and blades 14. Within these are stationary blades 17 carried on a fixed casing 11. A second stage of the pumping apparatus is provided by blades 53 carried on a rotor 54 which is driven through stepup gearing from the shaft 12. The stepup gearing includes a first gear 55 which is secured to the shaft 12 meshing with a gear 56 on a short shaft 57 parallel with the shaft 12. Also mounted on the shaft 57 is a larger gearwheel 58 meshing with a gearwheel 59 engaged around but not rotatable with the shaft 12. The gear 59 is secured by screws 61 and a keyway to a sleeve 62 carrying the blades 53 of the second stage. The sleeve 62 is mounted in needle roller bearings 63 and 64 between which is a sealing assembly similar to that identified by numeral 44 in FIG. 1 and including two resilient rings and a split ring 45. Within the sleeve 62 are further needle roller bearings 65, 66 which carry a further sleeve 67 to which is connected an extension 68 of the stationary casing 11. This extension 68 carries the lower ends of the stationary blades 17.

The blades 53 are not welded to the rotor 54 but instead are adjustable relatively thereto by means of a mechanism (not shown). The mechanism includes pivots on which the respective blades 53 are carried in the rotor 54 and a locking arrangement whereby each blade can be adjusted relative to the rotor. Calibration marks are provided to enable all the blades 53 to be adjusted to the same extent.

Figure 4:
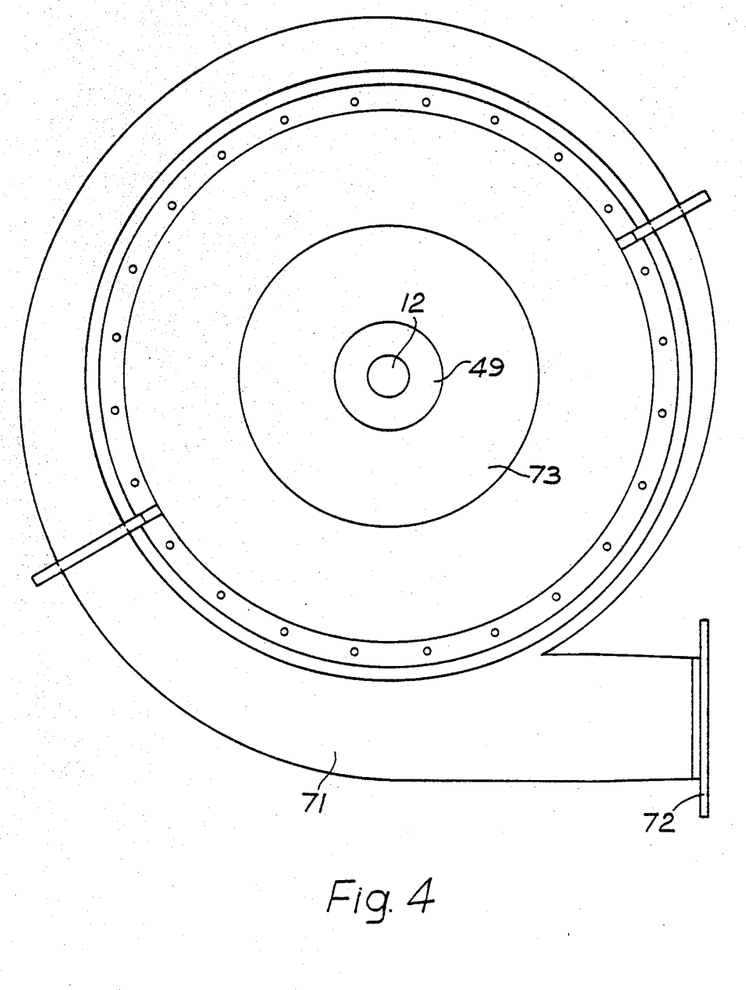
FIG. 4 is a plan view of the pumping apparatus shown in FIG. 3.

The blades 53 have a different shape from the blades 19 in that they extend upwardly to a greater extent and their upper edges are inclined outwardly and downwardly as shown. Otherwise the blades 53 are of the same part spiral form so that the liquid is delivered in an upward axial direction. Above the blades 53 there are blades 69 forming a further pumping stage which is a centrifugal pumping unit. The blades 69 have backward curvature to the direction of rotation. The blades 69 are fixed onto the rotor 54 and rotate at the same speed as the blades 53. They are also of narrowing section. The liquid is delivered into a volute shaped chamber 71 which at its outer larger end discharges into a pipeline or other means for carrying away the liquid. A flange 72 is shown in FIGS. 3 and 4 for such connection. The shape of the volute is clearly seen in the plan view of FIG. 4. The blades 69 increase the pressure of the liquid to deliver it in the volute 71 continuously.

A removable cover 73 at the top of the apparatus allows access to the gearing represented by the gears 55, 56, 58, 59. However, in this example the bearing 47 and seal 48 are attached to this cover 73.

In another example of pumping apparatus (not shown) the further or second stage of the pumping apparatus is a helically bladed lift pump situated in the center of the apparatus and there is a central outlet for the mixture.

Figure 5:
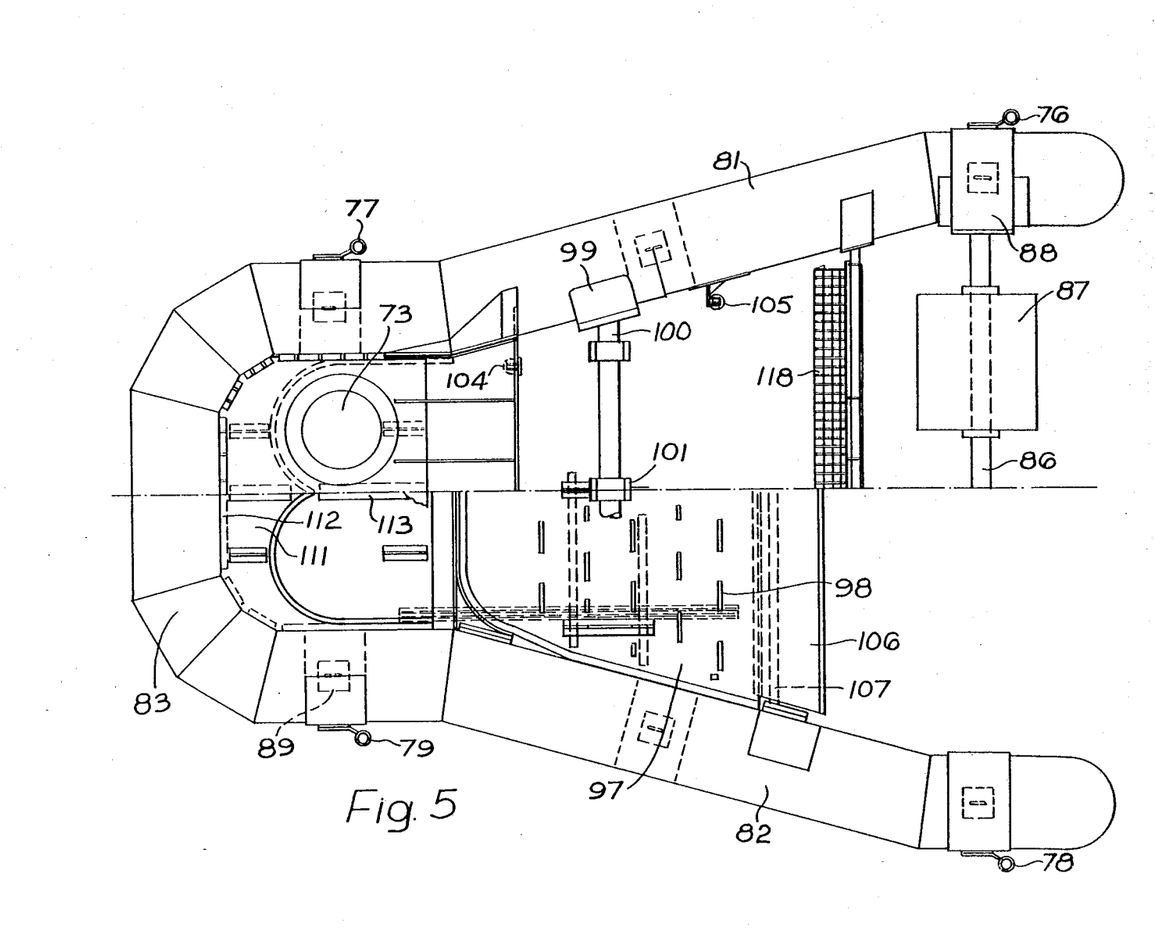
FIG. 5 is a plan view of a flotation unit carrying pumping apparatus.
Figure 6:
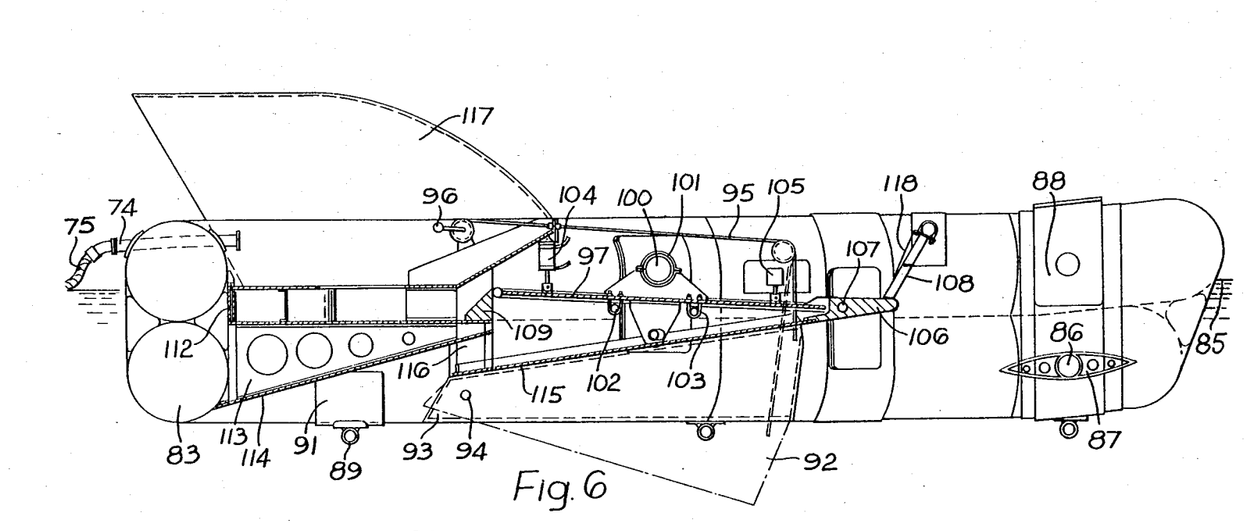
FIG. 6 is a side elevation view, partly in section of the unit shown in FIG. 5 and, FIG. 7 is an end elevation view of the unit shown in FIG. 5.
Figure 7:
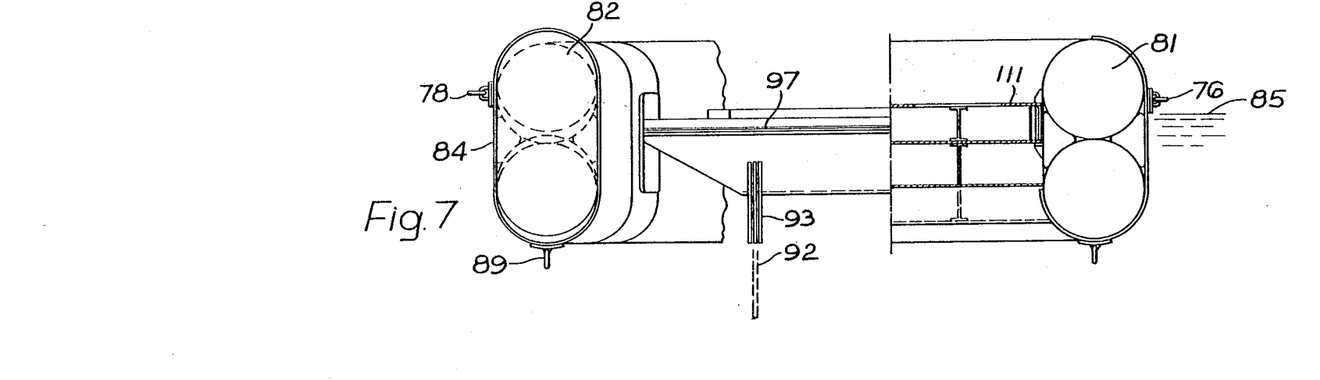

Referring to FIGS. 5, 6 and 7 there is shown a seagoing flotation unit which has mounted on it a pumping system comprising two pumping apparatus of the kind previously described. One of these is identified by numeral 73 in FIG. 5. These apparatus are mounted side by side and have respective outlets, one of which is shown in FIG. 6 at 74. These join into a common outlet pipe 75 preferably of flexible type for the delivery of the collected mixture to an associated vessel.

The flotation unit is intended to be towed by an attendant vessel and in one example it is attached by cables to the side of the vessel. A suitable cable arrangement is by springing which involves attachment at two spaced positions on the vessel and on the flotation unit, the forward cable being trailed from the flotation unit to the vessel whereas the after cable is trailed from the vessel to the flotation unit. This springing arrangement ensures that the flotation vessel will be towed in a straight ahead position. However the flotation unit may be towed in any convenient way beside a vessel either forward or aft or amidships or it may be provided with its own motor driven propeller so that it is self propelled.

For the attachment of towing cables there are four attachment points at 76, 77, 78, 79.

The unit comprises an inflatable generally U shaped structure having two forwardly directed divergent arms 81, 82 and a connecting portion 83 which surrounds the pumping system and forms the rear of the flotation unit. The inflatable structure is made up of two circular section inflatable bags of similar configuration and secured together by strapping, indicated particularly at 84 in FIG. 7. This strapping is preferably rubber or rubber like material and is bonded to the bags to secure them together. The bags have respective inflation points (not shown) whereby they can be independently inflated to a required degree. The degree of inflation governs the height at which the flotation unit rides in the water. Water level is indicated at 85 in FIGS. 6 and 7 but this may vary according to conditions such as the height of waves through which the unit is passing. In general the rougher the sea the deeper the unit should ride in the water but the height of the pumping system is also important and buoyancy may be varied to control the level of the inlets of the pumping apparatus in accordance with the level of material to be collected from the sea surface.

In particular the system is intended for the collection of oil from the surface of the sea but oils vary in density and therefore in the level in which they float at or below the water surface.

For further stabilizing the unit in the water there is a cross bar 86 extending across the front of the unit between the two arms 81, 82 of the inflatable structure this bar carrying adjustable vanes 87 one of which is seen in cross section in FIG. 6. Airfoil section in place of the narrow elliptical shape may be used. The cross bar 86 is secured to the inflatable structure by strapping 88 which is secured to the inflatable structure by strapping 88 which is secured to the inflatable structure with suitable flexible reinforcement which may be attached by appropriate adhesives.

Further stabilization of the unit is achieved by the attachment of sea anchors to one or more of the rings 89 on the underneath of the inflatable structure. These rings may be attached by reinforced patches 91 secured by adhesive to the strapping 84 of the inflatable structure. A sea anchor comprises a cylindrical bucket-like structure usually made of canvas with a hole in the bottom through which water can flow but which restricts movement of the sea anchor and therefore of the flotation unit to which it is attached by offering resistance to the outflow of water. Other forms of sea anchor may be provided.

To assist in the forward travel stability of the unit there are two retractable plates 92 contained in slotted structures 93. The plates 92 are hinged at 94 and are attached by cables 95 to a control 96 whereby the plates 92 can be raised and lowered as required.

Between the two arms 81,82 of the inflatable structure is mounted a platform 97. This is slotted at 98 over its surface, the slots being rearwardly and downwardly inclined so that a first separation of oil from water takes place by allowing the less dense water to flow through the slots underneath the unit. The platform is attached to a cross bar 100 which extends between the arms 81,82 of the inflatable structure and is secured at its ends by reinforced patches 99 to the strapping 84 of the structure. The cross bar 100 carries three swivel structures 101 which are attached to the platform 97 through reinforcing bars 102 and U bolts 103. The platform is therefore able to swivel about the axis of the cross bar 100 and such swivelling is controlled by respective hydraulic piston and cylinder units 104, 105 which are situated near the front and rear respectively of the platform. These are controlled in any convenient way from a remote position. The front of the platform engages in the rear end of a guide blade 106 which is also fixed by cross-member 107 extending transversely of the unit.

At the rear of the platform 97 is a weir plate 109 and behind this in turn is the structure 111 on which the pumping apparatus is mounted. This is made up of reinforced plates which define a general box structure forming a sump which however has a front opening adjacent to the weir plate 109 to receive the incoming flow of oil and water mixture. A rear wall 112 forms a baffle between the area surrounding the pumping system and the connecting portion at the rear of the flotation unit. Around the sides and rear of the platform 97 is a flexible inflatable tube forming a seal to prevent water flowing between the platform and the inflatable structure at any angle of the platform.

Beneath the pumping system are reinforcement plates 113 which as seen in FIG. 6 have lightening holes and which serve to support a plate 114 beneath the pumping system which forms a floor to that compartment. Beneath the platform 97 is a further plate 115 having its forward end adjacent to the guide blade 106 and having its rear end spaced below the forward end of the plate 114. Thus a transverse slot 116 is formed, through which water flowing through the slots in the platform 97 can escape underneath the unit. Other weir plates (not shown) may be attached to the platform to assist water dispersion.

Above the pumping apparatus there may be fitted a transparent canopy 117 which forms a weather protection against an operator riding on the flotation unit. The control 96 for the plates 92 and also appropriate hydraulic controls for the platform inclination 97 as well as for the vanes 87 may be situated within the canopy. Also it is possible for the operator to work upon the pumping apparatus as required. Oil supply for operation of such devices may be obtained directly from the attendant vessel or a manual system may be provided.

To trap any large debris which may be floating on the surface of the water and to prevent it entering the pumping apparatus a screen 118 may be attached to an arm 108 on the inflatable structure.

This apparatus is intended for seagoing use but where a similar flotation unit is required for inland waterways a simpler flotation unit may be provided. This has only one inflatable bag and it does not require the buoyancy and directional stability controls which are necessary on the seagoing version. Buoyancy height is simply controlled by the degree of inflation of the bag.

It is also possible to mount pumping apparatus on a simple flotation ring. This is a suitable arrangement where the equipment is to be used for example on a wellhead or other pool where forward travel of the unit across the surface is not required. In such a static position it may not be necessary to have a flotation ring at all but the unit is simply suspended by cables from a crane or other structure, the depth of immersion being determined by the depth of the liquid to be collected.

Any collected liquid may be carried away to any convenient storage or filtration plant. For example in the seagoing version the collected mixture may be taken to a barge or other storage vessel which may or may not be the attendant vessel used for towing the flotation unit. The filtration to separate the oil from the water may be carried out on such vessel or at some other place. For the collection of oil on the surface of the sea over a wide area it is possible to provide a series of the flotation units each with pumping system to travel over the surface of the sea in extended line and in this way substantial oil slicks may be collected.

The oil and water mixture may be pumped directly into barges. The liquid entering the pumping zone is preferably treated with a splitter or emulsifying chemical, which is conveniently metered into injectors and when the liquid has been allowed to settle in the barge for approximately 20 minutes separation occurs so that water can be pumped out.

I claim:

1. Pumping apparatus for collecting polluted liquids including a pumping unit comprising a stationary casing, an inlet and an outlet on said casing, a substantially vertically oriented drive shaft rotatably mounted in said casing, drive means operably connected to said drive shaft to drive said shaft about its substantially vertically oriented axis, a first pumping stage comprising a first annular rotor mounted for rotation on the lower end of said drive shaft and below said casing, forming the lower extremity of the apparatus, first blades mounted on the peripheral region of said first rotor at said inlet, shaped and operably arranged to pump liquid substantially radially inwardly with respect to the axis of rotation, stationary blades mounted on the lower extremity of said casing adjacent said inlet substantially between said first blades and said axis of rotation shaped and operably arranged to guide said liquid from said first blades substantially radially inwardly, and a further pumping stage comprising a second rotor mounted for relative rotation with respect to said casing and said drive shaft and in concentric surrounding relationship with respect to said shaft, gear means operably engaging between said drive shaft and said second rotor to drive said second rotor at higher rotational speed than said first rotor, second blades mounted on said second rotor adjacent the radially inner edges of said stationary blades shaped and arranged to pump said liquid from said stationary blades under pressure to and through said outlet.

2. Pumping apparatus as claimed in claim 1 wherein said first blades have a curved form in section with the convex faces being directed generally outwardly with respect to the rotor and the blades being generally inclined to the direction of rotation whereby the leading edge of each blade is the radially outer edge in the direction of rotation of the rotor.

3. Pumping apparatus as claimed in claim 2 wherein said stationary blades of the first pumping stage are generally curved in cross-section and have their convex faces directed oppositely with respect to the convex faces of said first blades.

4. Pumping apparatus as claimed in claim 3 wherein the inner end of each of the stationary blades is generally radial with respect to said axis of rotation.

5. Pumping apparatus as claimed in claim 4 wherein said further pumping stage rotor is mounted substantially concentrically with respect to said stationary blades.

6. Pumping apparatus as claimed in claim 5 wherein said second blades of the further pumping stage are generally part spiral in form whereby liquid entering between these blades in a generally horizontal radially inward direction is turned through an angle, to flow vertically.

7. Pumping apparatus as claimed in claim 5 wherein said second blades are shaped and arranged to pump the incoming liquid and lift it to an outlet above said further pumping stage.

8. Pumping apparatus as claimed in claim 7 wherein the outlet of the further pumping stage is directly above said second blades.

9. Pumping apparatus as claimed in claim 7 wherein said further pumping stage further comprises an outwardly directed centrifugal pump portion, and separate blades therefore whereby centrifugal force assists in the discharge of the liquid therefrom.

10. Pumping apparatus as claimed in claim 9 wherein said casing outlet comprises a volute chamber communicating with the outlet of said centrifugal pump portion.

11. Pumping apparatus as claimed in claim 9 wherein the blades of said centrifugal pump are adjustable to vary the flow therethrough.

12. Pumping apparatus as claimed in claim 1 wherein said drive means comprises a driving motor mounted on top of said casing.

13. Pumping apparatus as claimed in any one of the preceding claims and further comprising a flotation unit, said casing being mounted on said flotation unit so that said inlet is at least partially immersed in the liquid during use.

14. Pumping apparatus as claimed in claim 13 wherein at least one further said pumping unit is also mounted on the flotation unit so that the inlet thereof is at least partially immersed in the liquid during use.

15. Pumping apparatus as claimed in claim 13 wherein said flotation unit comprises an inflatable ring.

16. A pumping apparatus as claimed in claim 15 wherein said inflatable ring surrounds said pumping unit.

17. A pumping apparatus as claimed in claim 13 wherein said flotation unit comprises an inflatable structure and one or more pumping units are mounted on said flotation unit.

18. A pumping apparatus as claimed in claim 17 wherein said inflatable structure is generally U shaped, said pumping unit being mounted near the closed end of said structure.

19. A pumping apparatus as claimed in claim 18 wherein said U shaped structure has divergent arms and further comprising a platform supported between said arms and operatively associated therewith to guide the liquids towards the pumping unit, fluid pressure operated adjusting means operably connected to said platform to raise and lower its forward edge, and said platform is supported by a substantially horizontal pivot support situated substantially centrally of said platform.

20. A pumping apparatus as claimed in claim 19 wherein said platform has slots therethrough and further comprising guide plates operably mounted on said structure so that liquid flowing through said slots is directed below the unit.

21. A pumping apparatus as claimed in claim 20 and further comprising a mesh screen mounted on said structure and positioned ahead of said pumping unit in the direction of travel of the unit to prevent debris from entering said pumping unit.

22. A pumping apparatus as claimed in claim 18 wherein said U shaped structure comprises two inflatable bags, one disposed above the other and independent inflating means for each bag.

23. A pumping apparatus as claimed in claim 18 and further comprising adjustable vanes operatively mounted on said U-shaped structure and at least one connection for a sea anchor on said structure for stabilizing vertical movement of said flotation unit in use, and at least one elongated plate member adjustably mounted on said structure and oriented with the plan thereof substantially parallel to the direction of travel for stabilizing said flotation unit in the direction of travel.

* * * * *